(12) United States Patent
Ikeda

(10) Patent No.: US 12,406,465 B2
(45) Date of Patent: Sep. 2, 2025

(54) QUEUE ANALYSIS APPARATUS, CONTROL METHOD, AND NON-TRANSITORY COMPUTER-READABLE MEDIUM

(71) Applicant: NEC Corporation, Tokyo (JP)

(72) Inventor: Hiroo Ikeda, Tokyo (JP)

(73) Assignee: NEC CORPORATION, Tokyo (JP)

(\*) Notice: Subject to any disclaimer, the term of this patent is extended or adjusted under 35 U.S.C. 154(b) by 406 days.

(21) Appl. No.: 17/795,605

(22) PCT Filed: Feb. 7, 2020

(86) PCT No.: PCT/JP2020/004934
§ 371 (c)(1),
(2) Date: Jul. 27, 2022

(87) PCT Pub. No.: WO2021/157085
PCT Pub. Date: Aug. 12, 2021

(65) Prior Publication Data
US 2023/0048567 A1    Feb. 16, 2023

(51) Int. Cl.
*G06V 10/62* (2022.01)
*G06T 7/70* (2017.01)
*G06V 20/52* (2022.01)

(52) U.S. Cl.
CPC .......... *G06V 10/62* (2022.01); *G06T 7/70* (2017.01); *G06V 20/53* (2022.01); *G06T 2207/30196* (2013.01)

(58) Field of Classification Search
CPC ........ G06V 10/62; G06V 20/53; G06V 20/52; G06T 7/70; G06T 2207/30196
See application file for complete search history.

(56) References Cited

U.S. PATENT DOCUMENTS

2015/0120237 A1    4/2015  Gouda et al.

FOREIGN PATENT DOCUMENTS

| JP | 2006277248 A | * | 10/2006 |
| JP | 2007317052 A | * | 12/2007 |
| JP | 5613815 B1 |  | 10/2014 |
| JP | 2016-224651 A |  | 12/2016 |
| JP | 2018-106385 |  | 7/2018 |
| JP | 2019121987 A | * | 7/2019 |

OTHER PUBLICATIONS

Armero, Prior assessments for prediction in queues, The Statistician (1994) 43, No. 1, pp. 139-153 (Year: 1994).*
International Search Report for PCT Application No. PCT/JP2020/004934, mailed on Apr. 28, 2020.
JP Office Action for JP Application No. 2021-575579, mailed on Aug. 1, 2023 with English Translation.

\* cited by examiner

*Primary Examiner* — Vu Le
*Assistant Examiner* — Lei Zhao
(74) *Attorney, Agent, or Firm* — Sughrue Mion, PLLC

(57) ABSTRACT

A queue analysis apparatus (2000) estimates a position and an orientation of each object (20) included in a target image (10). The target image (10) is generated by a camera (50) that captures the object (20). The queue analysis apparatus (2000) generates a queue line (40) that expresses, by a linear shape, a queue included in a queue region (30) being a region representing a queue in the target image (10), based on a position and an orientation being estimated for each object (20) included in the queue region (30).

14 Claims, 18 Drawing Sheets

ORDER INFORMATION

| REFERENCE DIRECTION VECTOR | ADJACENT DIRECTION VECTOR |
|---|---|
| DIRECTION VECTOR 60-1 | DIRECTION VECTOR 60-2 |
| DIRECTION VECTOR 60-2 | DIRECTION VECTOR 60-3 |
| DIRECTION VECTOR 60-3 | NONE |

QUEUE ANALYSIS APPARATUS, CONTROL METHOD, AND NON-TRANSITORY COMPUTER-READABLE MEDIUM

This application is a National Stage Entry of PCT/JP2020/004934 filed on Feb. 7, 2020, the contents of all of which are incorporated herein by reference, in their entirety.

TECHNICAL FIELD

The present invention relates to an analysis of a queue of objects.

BACKGROUND ART

A technique for acquiring information related to a queue of people and the like from an image has been developed. For example, Patent Document 1 discloses a technique for detecting a pixel representing a stationary object from a time-series image, forming the pixels into a group by using advance knowledge related to a shape of a queue, and thus detecting a queue from an image.

RELATED DOCUMENT

Patent Document

[Patent Document 1] Japanese Patent Application Publication No. 2016-224651

DISCLOSURE OF THE INVENTION

Technical Problem

An image processing apparatus in Patent Document 1 requires advance knowledge related to a shape of a queue, such as an extending direction (a direction in which a queue extends) of a queue. Thus, a user of the image processing apparatus in Patent Document 1 requires labor for recognizing a shape of a queue in advance, and providing information related to the recognized shape to the image processing apparatus.

The present invention has been made in view of the problem described above, and one of objects of the present invention is to provide a technique capable of recognizing a state of a queue from an image with less labor.

Solution to Problem

A queue analysis apparatus according to the present invention includes: 1) an estimation unit that estimates a position and an orientation of an object included in a target image; and 2) a queue line generation unit that generates, for a queue region being a region including a queue of an object in the target image, a queue line representing a queue included in the queue region by a line, based on the position and the orientation being estimated for the object included in the queue region.

A control method according to the present invention is executed by a computer. The control method includes: 1) an estimation step of estimating a position and an orientation of an object included in a target image; and 2) a queue line generation step of generating, for a queue region being a region including a queue of an object in the target image, a queue line representing a queue included in the queue region by a line, based on the position and the orientation being estimated for the object included in the queue region.

A program according to the present invention causes a computer to execute the control method according to the present invention.

Advantageous Effects of Invention

According to the present invention, a technique capable of recognizing a state of a queue from an image with less labor is provided.

DESCRIPTION OF EMBODIMENTS

Hereinafter, example embodiments of the present invention will be described with reference to the drawings. Note that, in all of the drawings, a similar component has a similar reference sign, and description thereof will not be repeated as appropriate. Further, in each block diagram, each block represents a configuration of a functional unit instead of a configuration of a hardware unit unless otherwise described.

<Outline>

Figure 1:
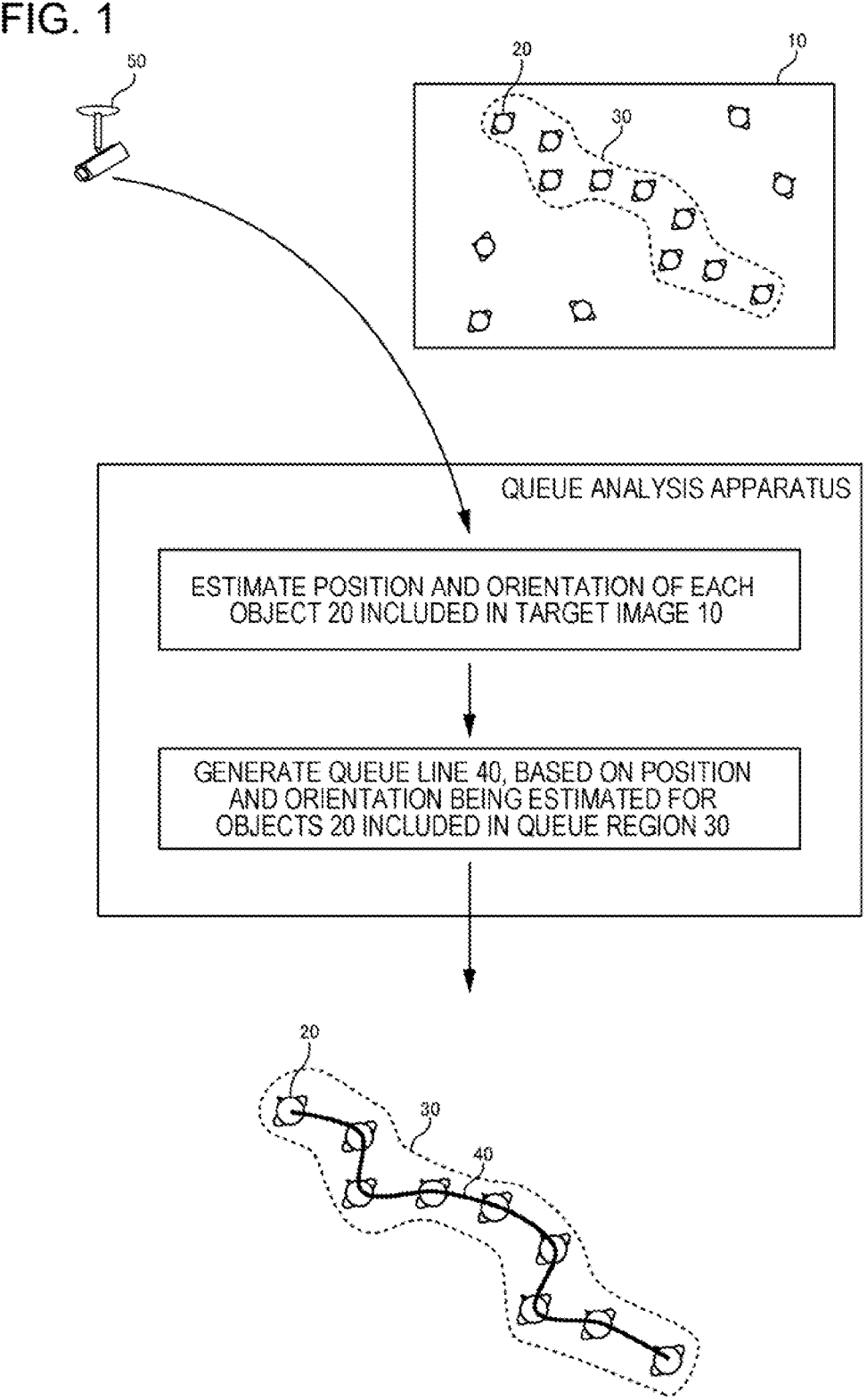
FIG. 1 is a diagram illustrating an outline of an operation of a queue analysis apparatus according to the present example embodiment.

FIG. 1 is a diagram illustrating an outline of an operation of a queue analysis apparatus 2000 according to the present example embodiment. FIG. 1 is a schematic diagram representing description for facilitating understanding of the operation of the queue analysis apparatus 2000, and does not specifically limit the operation of the queue analysis apparatus 2000.

The queue analysis apparatus 2000 generates a queue line 40 that expresses a queue included in a target image 10 by a linear shape. To do so, the queue analysis apparatus 2000 estimates a position and an orientation of each object 20 included in the target image 10. The target image 10 is generated by a camera 50 that captures the object 20. Note that, an example in which capturing is performed from immediately above is exemplified for the target image 10 illustrated in FIG. 1, but a capturing angle of view of the target image 10 is not limited, and capturing may be performed from any angle of view.

As the object 20, any object whose position may move can be handled. For example, as the object 20, a person and other animals, and a car, a motorcycle, and other vehicles can be handled. Herein, a group of a plurality of objects instead of one object may be handled as the object 20. This is, for example, a case where a mass of a few people is handled as one object 20, or the like. Conversely, a part of one object may be handled as the object 20. This is, for example, a case where only a head of a person instead of a whole of a person is handled as the object 20, or the like.

The queue analysis apparatus 2000 generates the queue line 40 that expresses, by a linear shape, a queue included in a queue region 30 being a region representing a queue in the target image 10, based on a position and an orientation being estimated for each object 20 included in the queue region 30. Herein, processing of determining the queue region 30 from the target image 10 may be performed by the queue analysis apparatus 2000, or may be performed by an apparatus other than the queue analysis apparatus 2000. Hereinafter, in order to simplify description, the processing of determining the queue region 30 is assumed to be performed by the queue analysis apparatus 2000 unless otherwise specified.

<Representative Advantageous Effect>

The queue analysis apparatus 2000 estimates a position and an orientation of each object 20 included in the target image 10, and generates the queue line 40 representing a shape of a queue of the objects 20, based on the estimated position and the estimated orientation of the object 20. According to this configuration, advance knowledge related to a shape of a queue, such as a direction in which a queue extends, may not be provided to the queue analysis apparatus 2000. Thus, a user of the queue analysis apparatus 2000 can recognize a state of a queue from the target image 10 with less labor.

Further, since advance knowledge related to a shape of a queue may not be provided, the queue line 40 can be generated from the target image 10 even in a case where a shape of a queue is not known in advance and when a queue has an unexpected shape.

Hereinafter, the queue analysis apparatus 2000 according to the present example embodiment will be described in more detail.

<Example of Functional Configuration of Queue Analysis Apparatus 2000>

Figure 2:
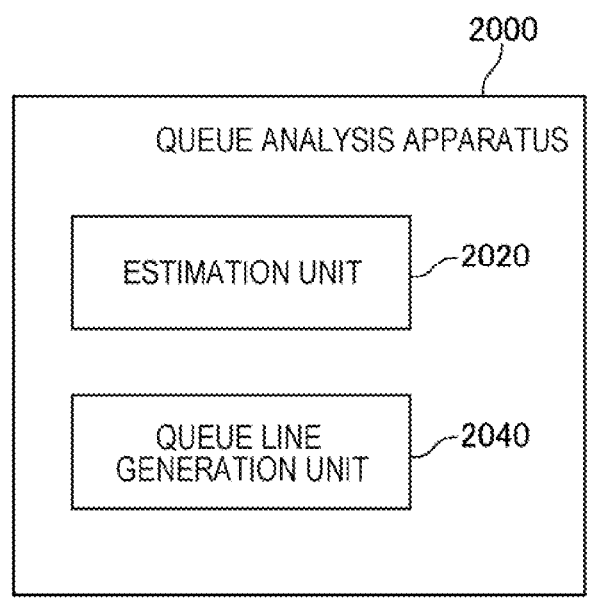
FIG. 2 is a diagram illustrating a configuration of the queue analysis apparatus according to an example embodiment 1.

FIG. 2 is a diagram illustrating a configuration of the queue analysis apparatus 2000 according to an example embodiment 1. The queue analysis apparatus 2000 includes an estimation unit 2020 and a queue line generation unit 2040. The estimation unit 2020 estimates a position and an orientation of the object 20 included in the target image 10. The queue line generation unit 2040 generates, for the queue region 30 in the target image 10, the queue line 40 that expresses, by a line, a queue included in the queue region 30, based on a position and an orientation being estimated for each object 20 included in the queue region 30.

<Hardware Configuration of Queue Analysis Apparatus 2000>

Each functional component unit of the queue analysis apparatus 2000 may be achieved by hardware (for example, a hard-wired electronic circuit, and the like) that achieves each functional component unit, and may be achieved by a combination of hardware and software (for example, a combination of an electronic circuit and a program that controls the electronic circuit, and the like). Hereinafter, a case where each functional component unit of the queue analysis apparatus 2000 is achieved by the combination of hardware and software will be further described.

Figure 3:
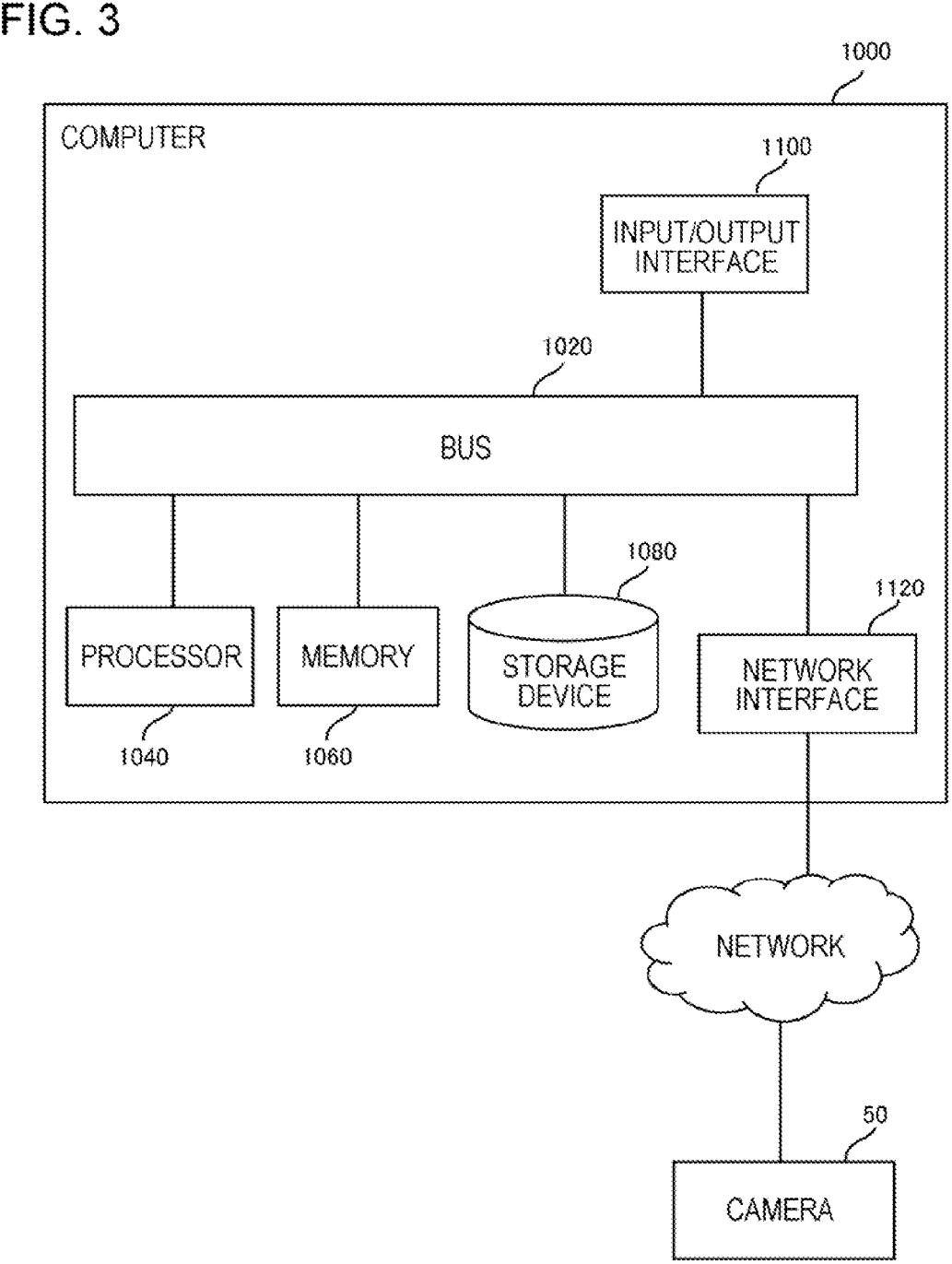
FIG. 3 is a diagram illustrating a computer for achieving the queue analysis apparatus.

For example, the queue analysis apparatus 2000 is achieved by one computer. FIG. 3 is a diagram illustrating a computer 1000 for achieving the queue analysis apparatus 2000. The computer 1000 is any computer. For example, the computer 1000 is a personal computer (PC), a server machine, a tablet terminal, a smartphone, or the like. The computer 1000 may be a dedicated computer designed for achieving the queue analysis apparatus 2000, and may be a general-purpose computer.

The computer 1000 includes a bus 1020, a processor 1040, a memory 1060, a storage device 1080, an input/output interface 1100, and a network interface 1120. The bus 1020 is a data transmission path for allowing the processor 1040, the memory 1060, the storage device 1080, the input/output interface 1100, and the network interface 1120 to transmit and receive data with one another. However, a method of connecting the processor 1040 and the like to each other is not limited to bus connection. The processor 1040 is a processor such as a central processing unit (CPU), a graphic processing unit (GPU), or a field-programmable gate array (FPGA). The memory 1060 is a main storage apparatus achieved by using a random access memory (RAM) and the like. The storage device 1080 is an auxiliary storage apparatus achieved by using a hard disk drive, a solid state drive (SSD), a memory card, a read only memory (ROM), or the like. However, the storage device 1080 may be constituted by hardware similar to hardware constituting the main storage apparatus, such as the RAM.

The input/output interface 1100 is an interface for connecting the computer 1000 and an input/output device. The network interface 1120 is an interface for connecting the computer 1000 to a communication network. The communication network is, for example, a local area network (LAN) and a wide area network (WAN). A method of connection to the communication network by the network interface 1120 may be wireless connection or wired connection.

The storage device 1080 stores a program module that achieves each functional component unit of the queue analysis apparatus 2000. The processor 1040 achieves a function associated with each program module by reading each of the program modules to the memory 1060 and executing the program module.

The queue analysis apparatus 2000 may be achieved by two or more computers. Each of the computers in this case also has the hardware configuration illustrated in FIG. 3, for example.

Herein, at least a part of a function of the queue analysis apparatus 2000 may be achieved by the camera 50. In other words, the camera 50 may be used as one of computers that achieve the queue analysis apparatus 2000. As the camera 50 that achieves at least a part of a function of the queue analysis apparatus 2000 in such a manner, for example, a camera referred to as an intelligent camera, a network camera, an Internet protocol (IP) camera, or the like can be used.

<Flow of Processing>

Figure 4:
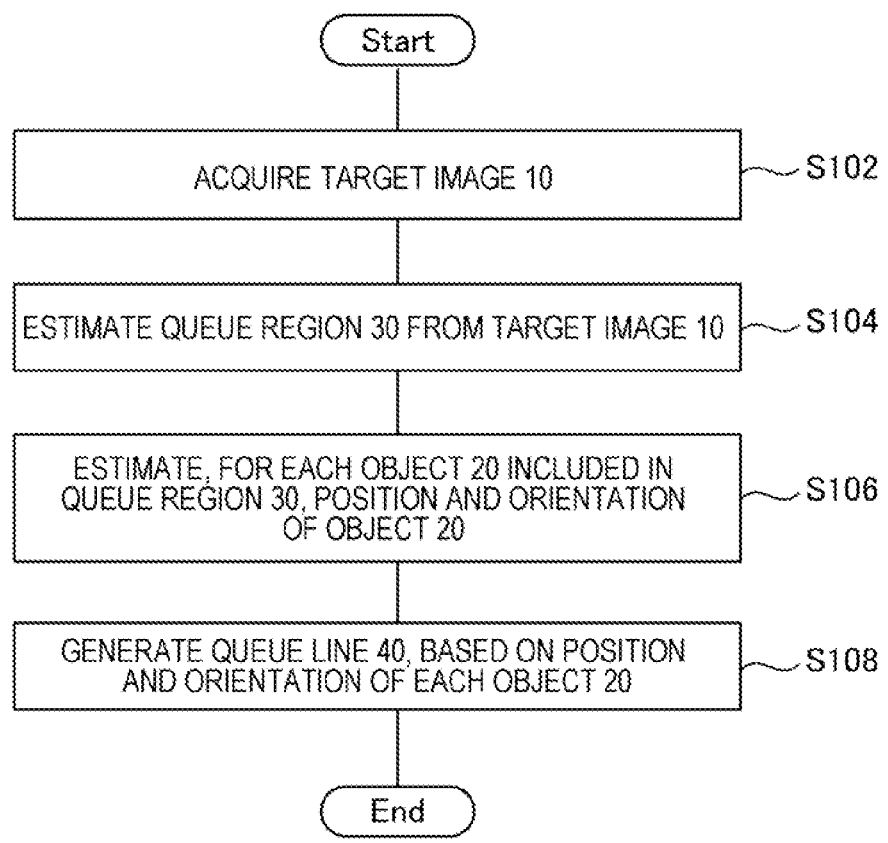
FIG. 4 is a flowchart illustrating a flow of processing performed by the queue analysis apparatus according to the example embodiment 1.

FIG. 4 is a flowchart illustrating a flow of processing performed by the queue analysis apparatus 2000 according to the example embodiment 1. The estimation unit 2020 acquires the target image 10 (S102). The estimation unit 2020 estimates the queue region 30 from the target image 10 (S104). The estimation unit 2020 estimates, for each object 20 included in the queue region 30, a position and an orientation of the object 20 (S106). The queue line generation unit 2040 generates the queue line 40, based on the position and the orientation being estimated for each object 20 included in the queue region 30 (S108).

Note that, a flow of the processing performed by the queue analysis apparatus 2000 is not limited to the example illustrated in FIG. 4. For example, the object 20 being a target of estimation of a position and an orientation may not only be the object 20 included in the queue region 30, but may also be all the object 20 included in the target image 10. In this case, for example, the queue analysis apparatus 2000 may perform estimation of a position and an orientation of the object 20 in parallel with estimation of the queue region 30, or may perform estimation of a position and an orientation of the object 20 before estimation of the queue region 30.

Further, as described above, the processing of determining the queue region 30 may be performed by an apparatus other than the queue analysis apparatus 2000. In this case, the queue analysis apparatus 2000 acquires information representing the queue region 30 from another apparatus.

<Acquisition of Target Image 10: S102>

The estimation unit 2020 acquires the target image 10 to be a processing target (S102). The target image 10 is any image acquired by capturing the object 20 by the camera 50. For example, the camera 50 is a surveillance camera provided at a place where a crowd of the objects 20 needs to be surveyed.

The camera 50 may be a video camera that generates a moving image, or a still camera that generates a still image. In the former case, the target image 10 is a video frame constituting a moving image generated by the camera 50.

Various methods of acquiring the target image 10 by the estimation unit 2020 can be used. For example, the estimation unit 2020 receives the target image 10 transmitted from the camera 50. In addition, for example, the estimation unit 2020 accesses the camera 50, and acquires the target image 10 stored in the camera 50.

Note that, the camera 50 may store the target image 10 in a storage apparatus provided outside the camera 50. In this case, the estimation unit 2020 acquires the target image 10 by accessing the storage apparatus. Thus, in this case, the queue analysis apparatus 2000 and the camera 50 may not be communicably connected to each other.

When a part or a whole of a function of the queue analysis apparatus 2000 is achieved by the camera 50, the queue analysis apparatus 2000 acquires the target image 10 generated by the queue analysis apparatus 2000 itself. In this case, the target image 10 is stored in a storage apparatus (for example, the storage device 1080) located inside the queue analysis apparatus 2000, for example. Thus, the estimation unit 2020 acquires the target image 10 from the storage apparatus.

A timing at which the estimation unit 2020 acquires the target image 10 is optional. For example, each time the target image 10 is generated by the camera 50, the estimation unit 2020 acquires the newly generated target image 10. In addition, for example, the estimation unit 2020 may regularly acquire the target image 10 that has not yet been acquired. For example, when the estimation unit 2020 acquires the target image 10 once in a second, the estimation unit 2020 collectively acquires one or more target images 10 being generated in one second (for example, 30 target images 10 when the camera 50 is a video camera having a frame rate of 30 frames/second (fps)).

The estimation unit 2020 may acquire all of the target images 10 generated by the camera 50, or may acquire some of the target images 10. In the latter case, for example, the estimation unit 2020 acquires the target image 10 generated by the camera 50 at a proportion of one to a predetermined number.

<Estimation of Queue Region 30>

As described above, the estimation unit 2020 may perform processing of estimating the queue region 30 from the target image 10. Herein, various existing techniques can be used as a technique for estimating a region representing a queue from an image.

For example, an estimator that estimates a queue region included in an image is provided in the estimation unit 2020, and the estimator is learned in advance. Note that, various kinds of models such as a neural network can be used as a model used as the estimator.

The estimator is learned in such a way as to output information representing the queue region 30 included in the target image 10 in response to an input of the target image 10. The information representing the queue region 30 is information that can determine a pixel included in the queue region 30 among pixels included in the target image 10. For example, the information representing the queue region 30 is information listing coordinates of each pixel included in the queue region 30, information indicating whether each pixel included in the target image 10 is included in the queue region 30, and the like. In addition, for example, when the queue region 30 is represented by a polygon, the information representing the queue region 30 may indicate coordinates of each vertex of the polygon.

An existing technique can be used for learning the estimator that estimates a queue region. For example, a plurality of pieces of learning data formed of a set of "a learning image, and information representing a queue region in the learning image" are prepared. Then, for each piece of the learning data, by performing processing of "inputting a learning image included in the learning data into an estimator, computing a loss representing an error between an output (a queue region estimated from the learning image by the estimator) of the estimator and the queue region indicated by the learning data, and updating a parameter of the estimator in such a way as to minimize the loss", the estimator can be learned.

As described above, the processing of estimating the queue region 30 from the target image 10 may be performed by an apparatus other than the queue analysis apparatus 2000. In this case, the estimation unit 2020 acquires information representing the queue region 30 from the another apparatus. For example, the information is information in which information that determines each of one or more queue regions 30 estimated for the target image 10 is associated with identification information about the target image 10.

<Estimation of Position and Orientation of Object 20>

The estimation unit 2020 estimates a position and an orientation of the object 20 included in the target image 10. Herein, an existing technique can be used as a technique for estimating, for an object such as a person included in an image, a position and an orientation of the object.

For example, an estimator configured in such a way as to output a position and an orientation of each of one or more objects 20 included in the target image 10 in response to an input of the target image 10 is provided in the estimation unit 2020. Then, the estimator is learned in advance by using learning data. In this case, the estimation unit 2020 can acquire a position and an orientation of each object 20 included in the target image 10 by inputting the target image 10 into the estimator. Note that, any model such as a neural network can be used as a model of the estimator.

In addition, for example, the estimation unit 2020 may estimate a position of the object 20 by detecting a predetermined feature value of the object 20 from the target image 10. At this time, by preparing a feature value for each orientation of the object 20 as a feature value of the object 20, not only estimation of a position of the object 20 but also estimation of an orientation of the object 20 can be performed.

A position and an orientation of the object 20 may be estimated by a time-series analysis using not only one target image 10 but a plurality of the target images 10. For example, a position and an orientation of the object 20 are represented by a state space model, and a parameter of the model is estimated by using the target images 10 in time series, and thus a model that can estimate a position and an orientation of the object 20 at a desired point in time can be acquired. Note that, various algorithms such as a Kalman filter and a particle filter can be used for estimation of a parameter.

Herein, as described above, a group of a plurality of objects and a part of one object may be handled as the object 20. In a case where a group of a plurality of objects are handled as one object 20, for example, a technique using a crowd patch disclosed in Patent Document 2 can be used as a technique for estimating a position and an orientation of the object 20.

<Generation of Queue Line 40>

The queue line generation unit 2040 generates the queue line 40. For example, generation of the queue line 40 can be achieved by a flow exemplified below.

Figure 5:
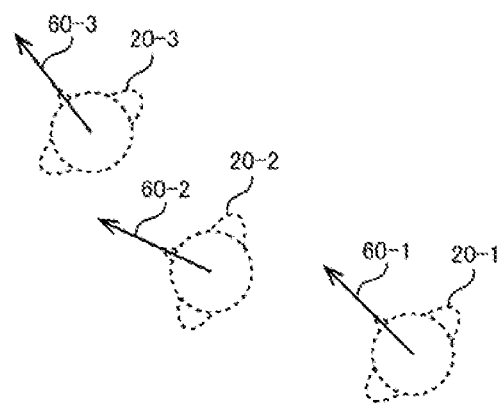
FIG. 5 is a diagram illustrating a direction vector computed for each object.

First, the queue line generation unit 2040 computes a direction vector representing a position and an orientation of each object 20, based on a position and an orientation being estimated for each object 20 included in the queue region 30. FIG. 5 is a diagram illustrating a direction vector computed for each object 20 included in the queue region 30. For example, a direction vector 60 of a certain object 20 is computed as a vector in which a starting point of the direction vector 60 is a position estimated for the object 20, and an orientation of the direction vector 60 is an orientation estimated for the object 20.

A length of a direction vector may be a fixed length predetermined for all direction vectors, or may be a length different for each direction vector. In the latter case, for example, a length of each direction vector 60 is determined in such a way that lengths of the direction vectors 60 are identical when the direction vectors 60 are mapped in the real world. In a case where the camera 50 faces obliquely below and performs capturing, lengths on the target image 10 vary depending on a position and a direction of objects even when the objects having the same length are captured. Thus, for example, a reference length of the direction vector 60 in the real world is predetermined. Then, the queue line generation unit 2040 computes the direction vector 60 associated with the object 20, as a vector on the target image 10 to be a vector having a reference length drawn from a position of the direction vector 60 in an orientation of the direction vector 60 when the direction vector 60 is mapped in the real world, based on a position and an orientation being estimated for the object 20.

The queue line generation unit 2040 performs ordering of a direction vector. For example, three objects 20 are included in the queue region 30, three direction vectors 60 are ordered by determining each of a front, a second, and a third from among the direction vectors 60. Hereinafter, information representing ordering of the direction vector 60 is referred to as order information.

Ordering of the direction vector 60 can be achieved by, for example, determining, for each direction vector 60, another direction vector 60 adjacent to the direction vector 60 with reference to an end point of the direction vector 60. Herein, another direction vector A2 adjacent to a direction vector A1 with reference to an end point is the direction vector 60 having a starting point thereof closest to an end point of the direction vector A1 among the direction vectors 60 having at least a part thereof being included in the queue region 30. The object 20 associated with the direction vector A2 is the object 20 located right in front of the object 20 associated with the direction vector A1 in a queue.

In this way, by determining, for each direction vector 60, another direction vector 60 adjacent to the direction vector 60 with reference to an end point of the direction vector 60, the direction vector 60 located right in front (the direction vector 60 associated with the object 20 located right in front of the object 20 associated with the direction vector 60) can be determined. Thus, each direction vector 60 can be ordered.

Figure 6:
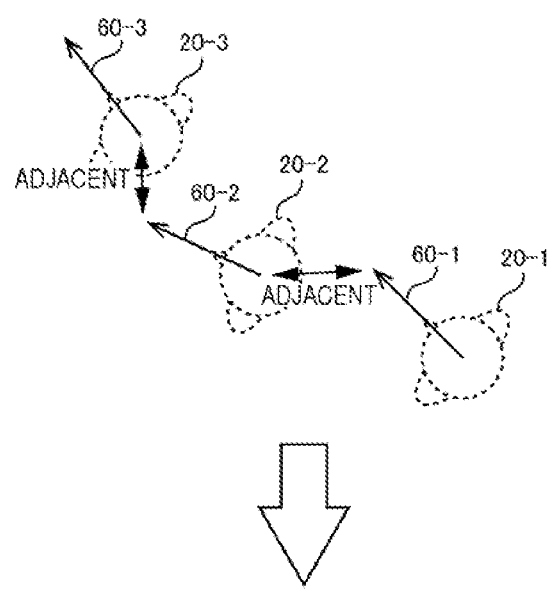
FIG. 6 is a diagram illustrating order information in a table format.

FIG. 6 is a diagram illustrating order information in a table format. In FIG. 6, a direction vector 60-1 is adjacent to a direction vector 60-2 with reference to an end point of the direction vector 60-1. Further, the direction vector 60-2 is adjacent to a direction vector 60-3 with reference to an end point of the direction vector 60-2. Thus, an order of the direction vectors 60 in a queue is the "direction vector 60-1, the direction vector 60-2, and the direction vector 60-3" in an order from an end.

The queue line generation unit 2040 generates the queue line 40 by using each direction vector 60 and the order information. For example, the queue line generation unit 2040 generates the queue line 40 by connecting the direction vectors 60 according to an order indicated in the order information. More specifically, the queue line generation unit 2040 connects, for each direction vector 60, an end point of the direction vector 60 to a starting point of another direction vector 60 adjacent to the direction vector 60 with reference to the end point of the direction vector 60.

Figure 7:
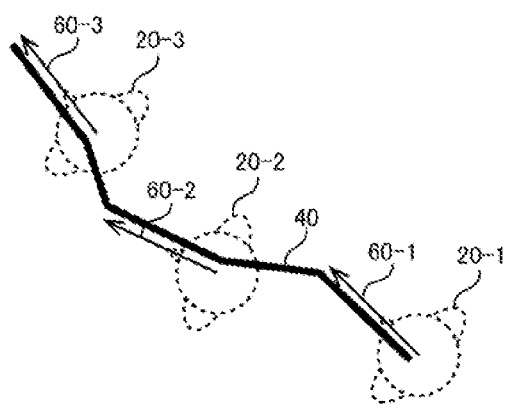
FIG. 7 is a diagram illustrating a queue line generated by connecting direction vectors.

FIG. 7 is a diagram illustrating the queue line 40 generated by connecting the direction vectors 60. Note that, in order to make the drawing clear, FIG. 7 illustrates the queue line 40 in a position slightly shifted from the direction vector 60 in such a way that the queue line 40 does not overlap the direction vector 60. In an actual operation, the queue line 40 may overlap the direction vector 60.

Order information illustrated in FIG. 7 is the same as the order information illustrated in FIG. 6. The order information indicates that the direction vector 60-1 is adjacent to the direction vector 60-2 with reference to the end point of the direction vector 60-1. Then, the queue line generation unit 2040 connects the end point of the direction vector 60-1 to a starting point of the direction vector 60-2. Further, the order information indicates that the direction vector 60-2 is adjacent to the direction vector 60-3 with reference to the end point of the direction vector 60-2. Then, the queue line generation unit 2040 connects the end point of the direction vector 60-2 to a starting point of the direction vector 60-3. As a result, the queue line 40 acquired by connecting the direction vector 60-1 to the direction vector 60-3 is generated.

Figure 8:
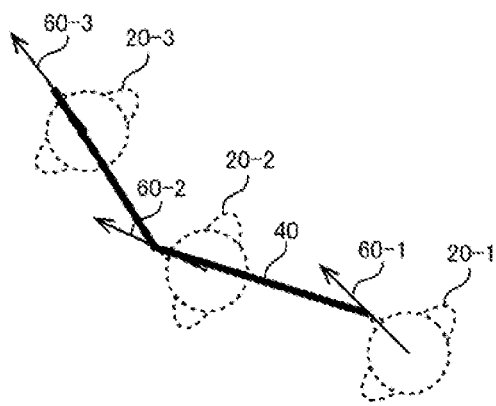
FIG. 8 is a diagram illustrating a queue line generated by connecting middle points of the direction vectors.

A method of generating the queue line 40 by using the direction vector 60 and the order information is not limited to the method described above. For example, the queue line generation unit 2040 may generate the queue line 40 by connecting predetermined positions (for example, a starting point, a middle point, an end point, or the like) of the direction vectors 60 adjacent to each other. FIG. 8 is a diagram illustrating the queue line 40 generated by connecting middle points of the direction vectors 60. Order information is the same as that in the examples in FIGS. 6 and 7. Thus, the queue line generation unit 2040 generates the queue line 40 by connecting a middle point of the direction vector 60-1 to a middle point of the direction vector 60-2, and connecting a middle point of the direction vector 60-2 to a middle point of the direction vector 60-3.

Figure 9A:
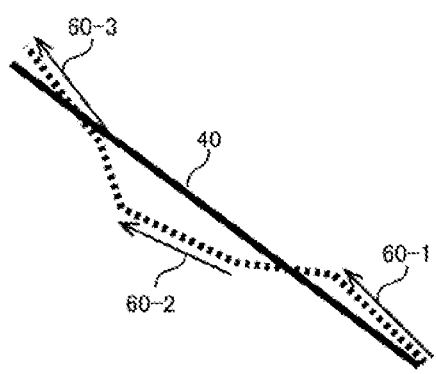
FIGS. 9A and 9B are diagrams illustrating a queue line acquired by linear approximation.
Figure 9B:
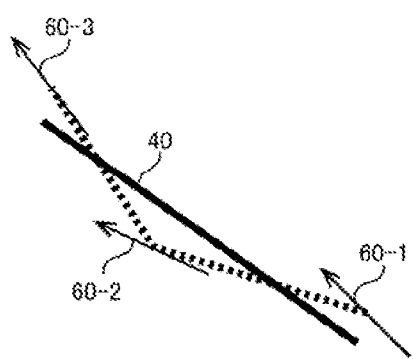

The queue line generation unit 2040 may perform processing (so-called linear approximation) of generating one straight line passing through the vicinity of each point (such as a starting point, a middle point, and an end point) of the direction vector 60, and set, as the queue line 40, the one straight line acquired as a result of the processing. FIGS. 9A and 9B are diagrams illustrating the queue line 40 acquired by the linear approximation. In order to make the drawing clear, the object 20 is omitted from FIGS. 9A and 9B.

FIG. 9A illustrates a case where the linear approximation is applied in the example in FIG. 7. The queue line 40 represents a queue line acquired by the linear approximation, and a zigzag dotted line represents the queue line 40 in FIG. 7.

FIG. 9B illustrates a case where the linear approximation is applied in the example in FIG. 8. The queue line 40 represents a queue line acquired by the linear approximation, and a zigzag dotted line represents the queue line 40 in FIG. 8.

Note that, an existing technique can be used as a specific technique for computing one straight line passing through the vicinity of a plurality of points by the linear approximation.

Figure 10A:
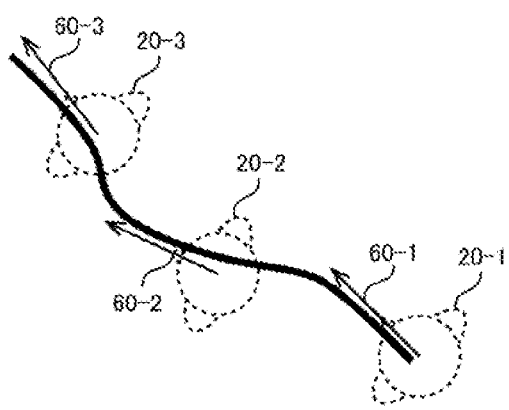
FIGS. 10A and 10B are diagrams illustrating a case where non-linear interpolation processing is performed in generation of a queue line.
Figure 10B:
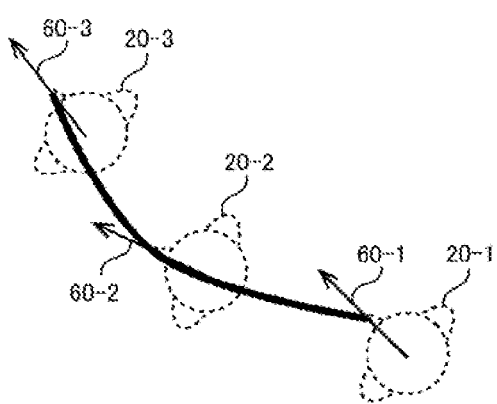
Figure 11A:
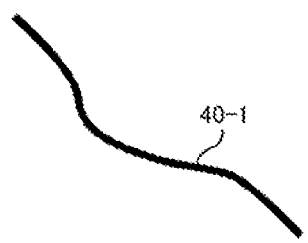
FIGS. 11A to 11E are diagrams illustrating a shape that can be used as a queue line.
Figure 11B:
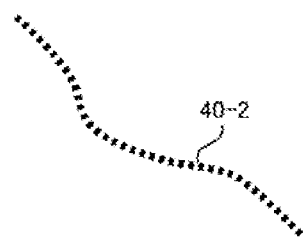
Figure 11C:
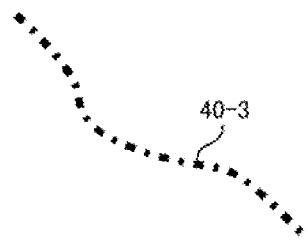
Figure 11D:
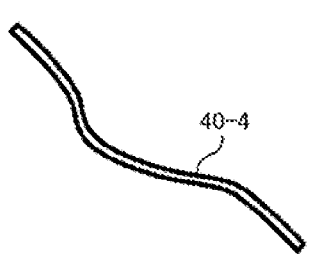
Figure 11E:
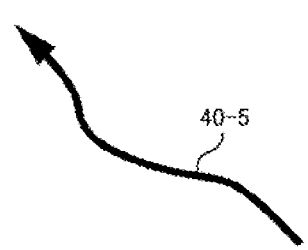

The queue line generation unit 2040 may perform non-linear interpolation in connection between the direction vectors 60. FIGS. 10A and 10B are diagrams illustrating a case where the non-linear interpolation processing is performed in generation of the queue line 40. FIG. 10A illustrates a case where the non-linear interpolation processing is applied in the example in FIG. 7. Specifically, in a case where the end point of the direction vector 60-1, the starting point of the direction vector 60-2, the end point of the direction vector 60-2, and the starting point of the direction vector 60-3 are connected in this order, the queue line 40 is generated as a smooth curved line passing through points of the direction vectors or the vicinity thereof instead of being generated by simply connecting (linear-interpolating) the direction vectors.

FIG. 10B illustrates a case where the non-linear interpolation processing is applied in the example in FIG. 8. Specifically, in a case where the middle point of the direction vector 60-1, the middle point of the direction vector 60-2, and the middle point of the direction vector 60-3 are connected, the queue line 40 is generated as a smooth curved line passing through points of the direction vectors or the vicinity thereof.

Herein, various existing techniques can be used as a specific technique for computing a curved line passing through a plurality of specific points or the vicinity thereof by the non-linear interpolation.

<<Shape that can be Used as Queue Line 40>>

As the queue line 40, any linear shape can be adopted. FIGS. 11A to 11E are diagrams illustrating a shape that can be used as the queue line 40. As the queue line 40, any line such as a solid line (40-1), a dotted line (40-2), or a dot-and-dash line (40-3) can be adopted. Further, a hollow line (shape acquired by stretching out a rectangle) may be used as the queue line 40 (40-4). Further, the queue line 40 may be an arrow (40-5). Note that, a thickness of the queue line 40 is optional.

<Output of Information>

Figure 12:
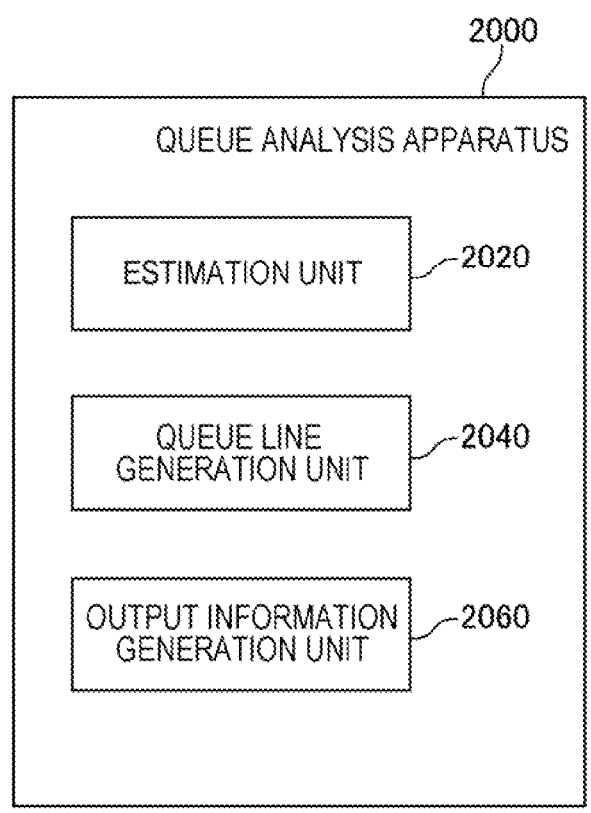
FIG. 12 is a block diagram illustrating a functional configuration of the queue analysis apparatus including an output information generation unit.

The queue analysis apparatus 2000 outputs various pieces of information related to the queue line 40. Hereinafter, the information is referred to as output information. Further, a functional configuration unit that outputs the output information is referred to as an output unit. FIG. 12 is a block diagram illustrating a functional configuration of the queue analysis apparatus 2000 including an output information generation unit 2060.

The output information may include various pieces of information. Hereinafter, various pieces of information that may be included in the output information will be described.

<<Provision of Queue Line 40>>

Figure 13:
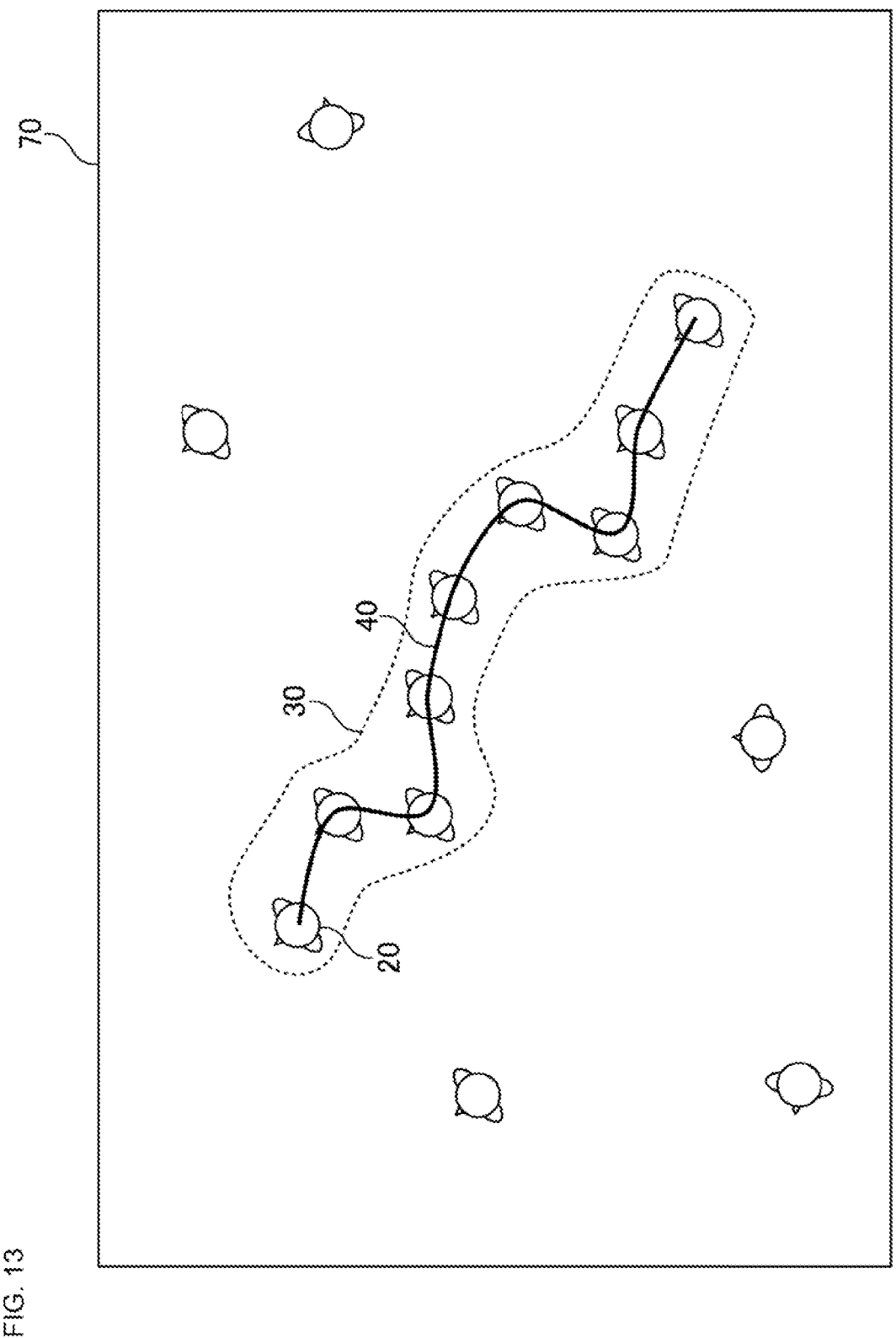
FIG. 13 is a diagram illustrating a result image.

For example, the output information generation unit 2060 generates, as the output information, an image (hereinafter, a result image) in which the queue line 40 is superimposed on the target image 10. FIG. 13 is a diagram illustrating a result image. In a result image 70 in FIG. 13, the queue line 40 achieved as a solid line is superimposed on the target image 10. Further, in this example, a queue region is also superimposed on the target image 10. The queue region can be superimposed by any method in such a way that a boundary of a region is superimposed by a line, the inside of a region is superimposed by a semitransparent color, a region is emphasized by reducing a brightness value other than the region, or the like.

Herein, the output information generation unit 2060 may superimpose the queue line 40 generated by the queue line generation unit 2040 only on the target image 10 used for generating the queue line 40, or may further superimpose the queue line 40 on the target image 10 other than the target image 10 used for generating the queue line 40. For example, the queue line generation unit 2040 is assumed to extract the target image 10 at a proportion of one in one second from a video image at 30 frames/second being generated from the camera 50, and generate the queue line 40 from the extracted target image 10. When the queue line 40 is superimposed only on the target image 10 used for generation of the queue line 40, the result image 70 is time-series data at one frame/second. In other words, the time-series result image 70 represents a change in a position of the object 20 and the queue line 40 by one frame/second.

On the other hand, when the queue line 40 is also superimposed on the target image 10 other than the target image 10 used for generation of the queue line 40, for example, the output information generation unit 2060 superimposes the queue line 40 generated from a certain target image 10 on not only the certain target image 10 but also on 29 target images 10 (each target image 10 before the target image 10 used for generation of the queue line 40 next) being generated after the certain target image 10. In other words, one queue line 40 is superimposed on a video image of a second. In this case, the time-series result image 70 represents a change in a position of the object 20 by 30 frames/second, and represents a change in the queue line 40 by one frame/second.

<<Provision of Front and End>>

Figure 14:
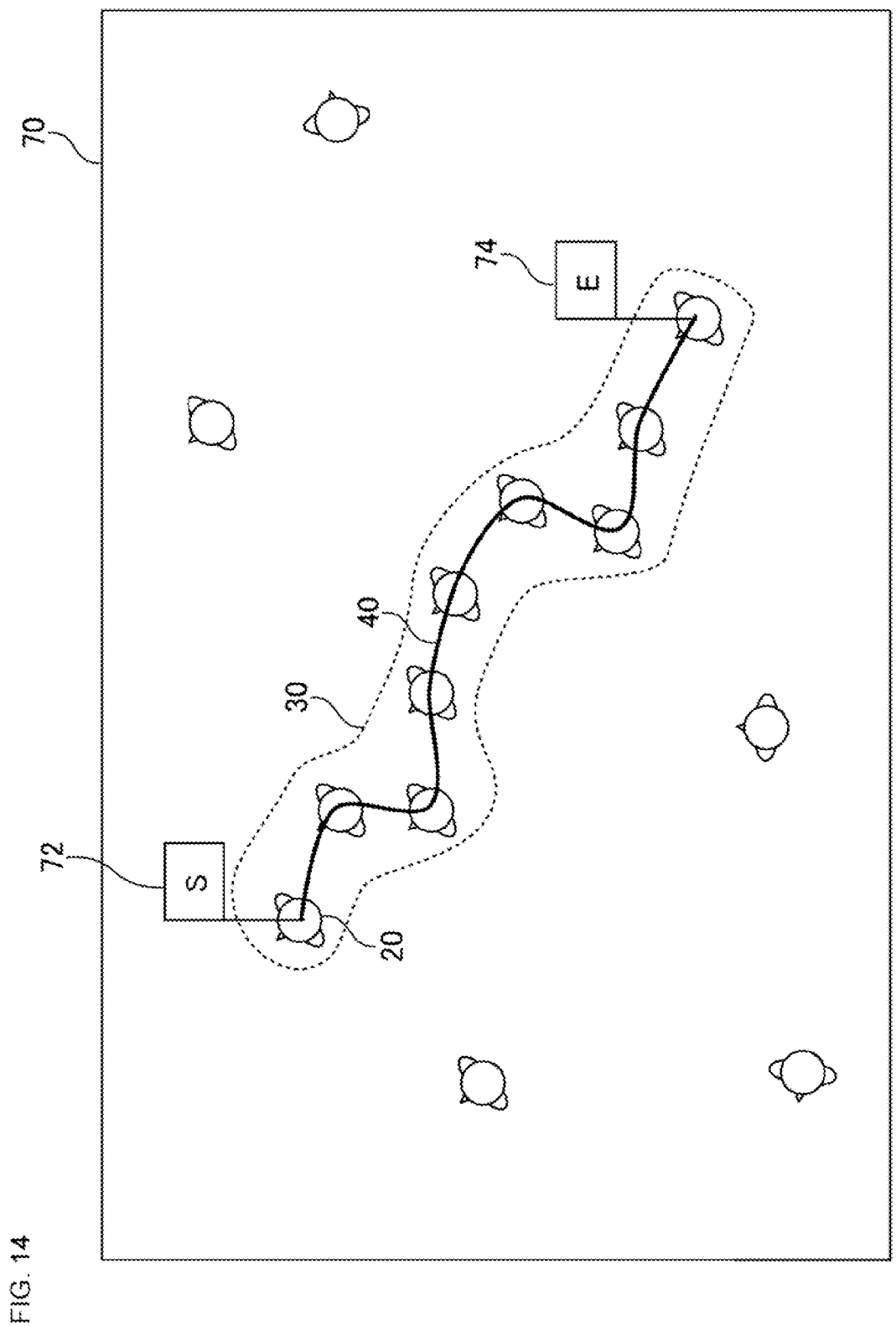
FIG. 14 is a diagram illustrating a result image indicating a front position and an end position of a queue.

The output information may further include information representing one or both of a front position and an end position of a queue. FIG. 14 is a diagram illustrating the result image 70 indicating a front position and an end position of a queue. The result image 70 in FIG. 14 is acquired by superimposing, on the target image 10, each of a front marker 72 representing a front position and an end marker 74 representing an end position.

Various methods of determining a front position and an end position of a queue can be used. For example, the output information generation unit 2060 determines, as a front position of a queue, an end point associated with a front direction vector 60 in ordering of the direction vector 60 among end points of the queue line 40. On the other hand, the output information generation unit 2060 determines, as an end position of a queue, an end point associated with an end direction vector 60 in ordering of the direction vector 60 among end points of the queue line 40.

Further, as in a queue formed in front of a checkout counter and the like, an approximate position of a front position of a queue may be clear in advance. In this case, a position predicted to be a front position of a queue is predetermined. Then, the output information generation unit 2060 determines, as a front position of the queue, an end point closer to the predicted position among end points of the queue line 40, and determines another position as an end position of the queue.

Herein, the result image 70 in FIGS. 13 and 14 includes a frame of a dotted line representing an outer frame of the queue region 30. However, the result image 70 may not include a frame representing the queue region 30.

<<Provision of Waiting Time>>

The output information generation unit 2060 may compute a waiting time in any position of a queue by using the queue line 40. In this case, it is assumed that, in principle, the object 20 joins a queue from an end of the queue line 40, advances from the end toward a front of the queue line 40, and eventually leaves the queue from a front position. Then, a waiting time in a certain position of a queue refers to a time required since the object 20 reaches the certain position until the object 20 leaves from a front of the queue.

For example, the output information generation unit 2060 computes a waiting time at an end of a queue. The waiting time at the end of the queue is computed based on a length of the queue line 40 or a size (area) of the queue region 30, for example. In this case, a waiting time associated with a unit length of the queue line 40 or a unit area of the queue region 30 is predetermined. Then, the output information generation unit 2060 computes the waiting time at the end of the queue by multiplying the length of the queue line 40 by the waiting time associated with the unit length of the queue line 40 or by multiplying the area of the queue region 30 by the waiting time associated with the unit area of the queue region 30.

Figure 15:
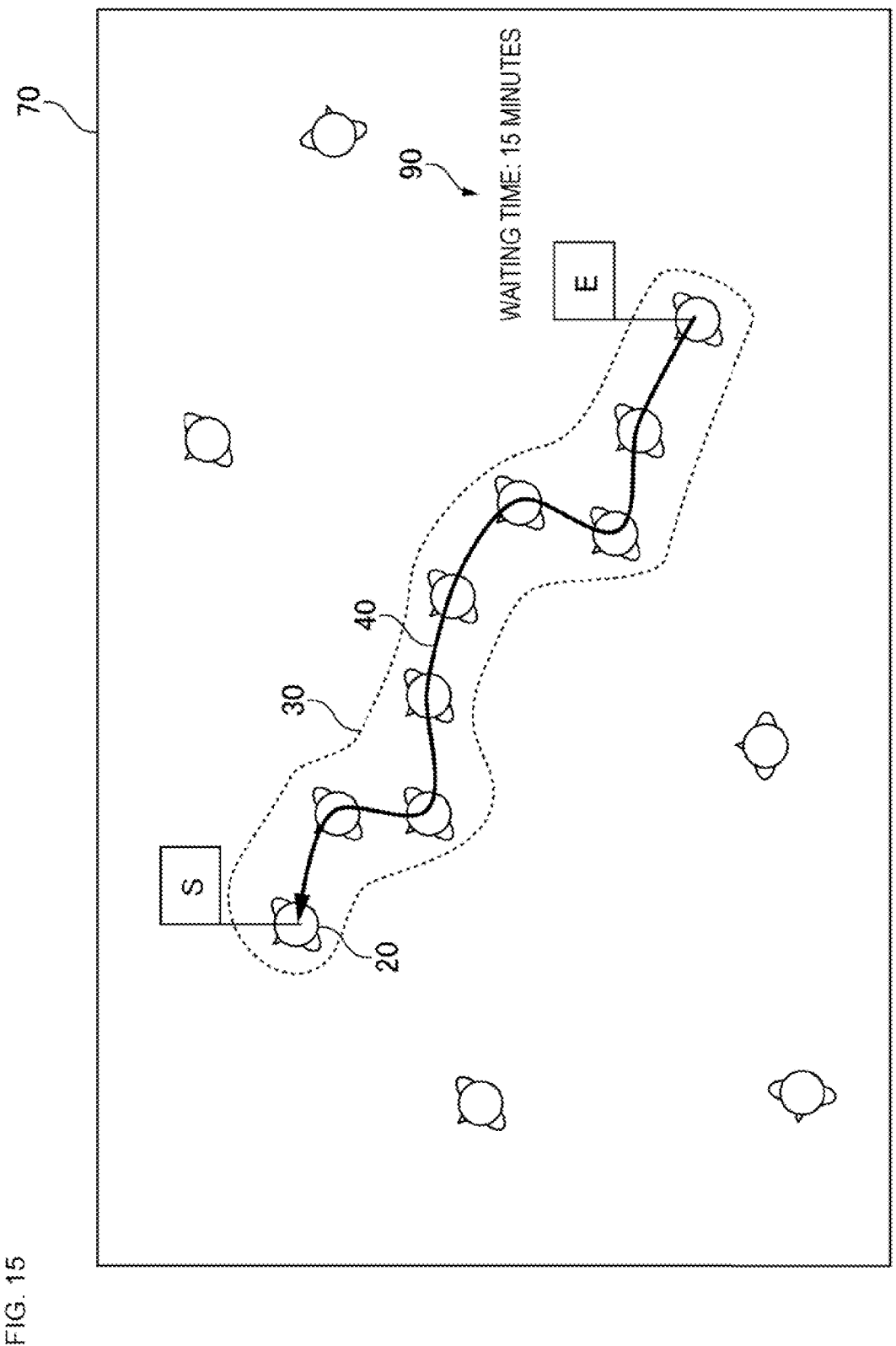
FIG. 15 is a diagram illustrating a result image indicating a waiting time at an end.

FIG. 15 is a diagram illustrating the result image 70 indicating a waiting time at an end. The result image 70 in FIG. 15 is acquired by further adding a waiting time display 90 representing a waiting time at the end of the queue line 40 to the result image 70 in FIG. 14.

The queue analysis apparatus 2000 can compute a waiting time at an end of a queue even in a situation in which a place where a queue is to be formed is not predetermined and where and what kind of shape the queue is to be formed are not clear.

A position (hereinafter, a target position) being a computation target of a waiting time is not limited to the end of the queue line 40. When any position other than the end of the queue line 40 is handled as a target position, the output information generation unit 2060 computes a waiting time in the target position, based on a waiting time at an end of a queue. Specifically, first, the output information generation unit 2060 computes a length from a front of a queue to a target position along the queue line 40. Then, the output information generation unit 2060 computes a ratio (the computed length/an entire length of the queue line 40) between the computed length and the entire length of the queue line 40. Then, the output information generation unit 2060 computes a waiting time in the target position by multiplying the waiting time at the end of the queue by the computed ratio. In addition, for example, a waiting time may be computed by multiplying a length of the queue line 40 from a front of a queue to a target position and a size (area) of the queue region 30 by a waiting time associated with a unit length of the queue line 40 or by a waiting time associated with a unit area of the queue region 30.

The queue analysis apparatus 2000 can compute a distance from a front of a queue to each position on the queue along the queue line 40. Thus, as compared to a case where the queue line 40 is not used, a waiting time in any position of a queue can be more accurately recognized.

A target position may be automatically determined by the output information generation unit 2060, based on a predetermined reference, or may be specified by a user. In the former case, for example, the output information generation unit 2060 handles, as a target position, each division point when the queue line 40 is divided into a predetermined number, and an end. For example, when the predetermined number is three, two points are determined as division points at which the queue line 40 is divided into three. Thus, the output information generation unit 2060 handles, as a target point, each of the two points and an end, and computes a waiting time for the target point.

When a target position is specified by a user, for example, the queue analysis apparatus 2000 displays a screen including the result image 70 on a display apparatus, and receives a user input for specifying a point on the queue line 40. The output information generation unit 2060 handles, as a target position, a point specified in such a manner.

Figure 16:
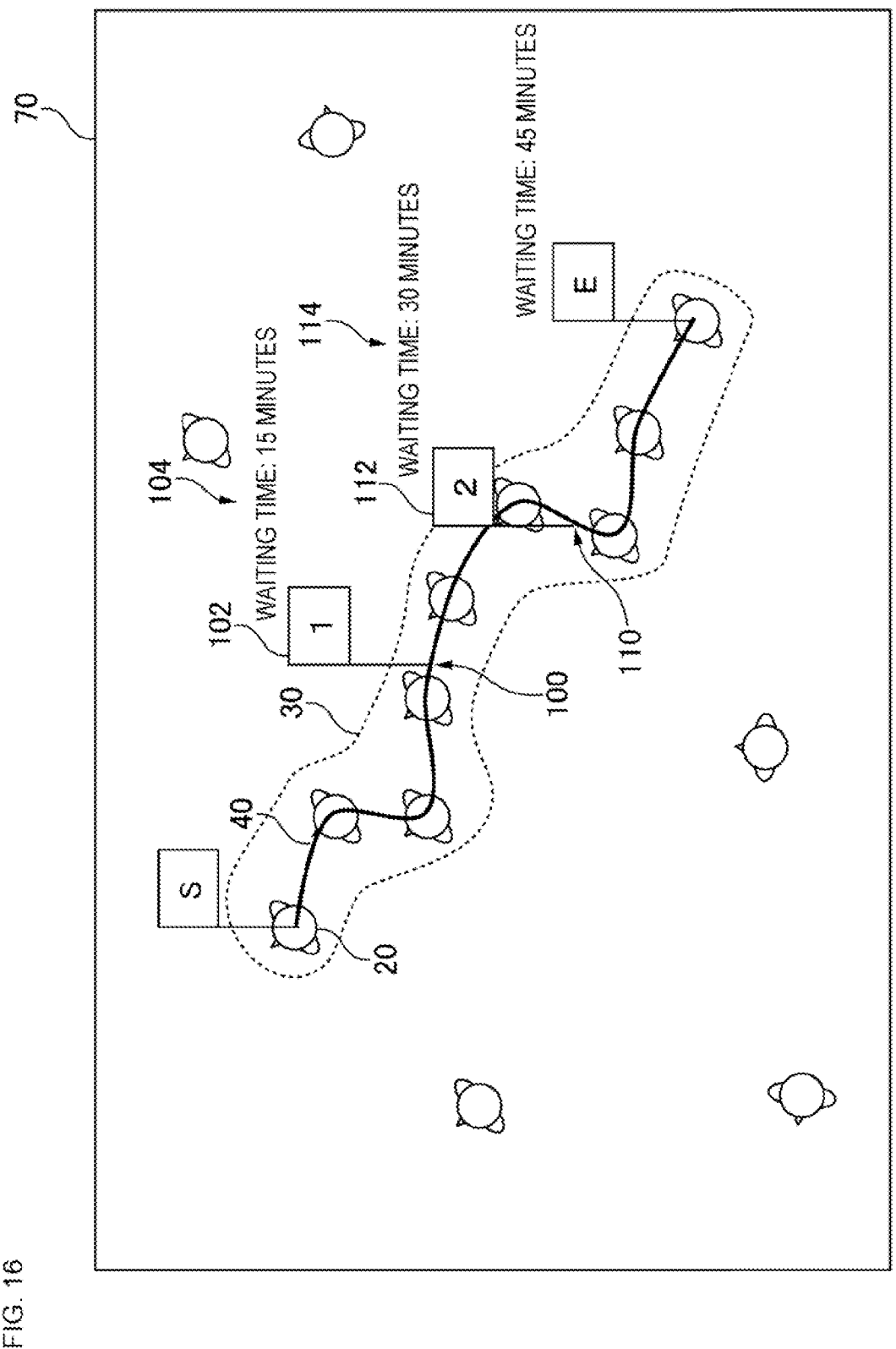
FIG. 16 is a diagram illustrating a result image also indicating a waiting time in a position other than an end.

FIG. 16 is a diagram illustrating the result image 70 also indicating a waiting time in a position other than an end. In FIG. 16, the queue line 40 is divided into three by a division position 100 and a division position 110. Then, in the result image 70, a display 102 representing the division position 100, a display 104 representing a waiting time in the division position 100, a display 112 representing the division position 110, and a display 114 representing a waiting time in the division position 110 are included.

Note that, as described above, as a method of computing a waiting time, a waiting time is computed based on a length of the queue line 40 or a size (area) of the queue region 30, but a waiting time may be similarly computed based on the number of people on the queue line 40. For example, a waiting time in a target position can be computed by multiplying the number of people from a front to the target position by a waiting time (a time required since a person moves to the front of a queue until the person leaves the queue) per person. In this case, a waiting time per person is predetermined.

<<Provision of Past Queue Line 40>>

The output information generation unit 2060 may include, in the result image 70, one or more queue lines 40 computed in the past for the same queue as a queue represented by the queue line 40 (latest queue line 40) generated by the queue line generation unit 2040 in addition to the queue line 40 generated by the queue line generation unit 2040. Note that, the "same queue" herein refers to a queue formed at the same place, such as a queue present at points in time different from each other in front of the same checkout counter, a queue in which the object 20 leaving from a front uses the same facility or the same place, and the like.

Figure 17:
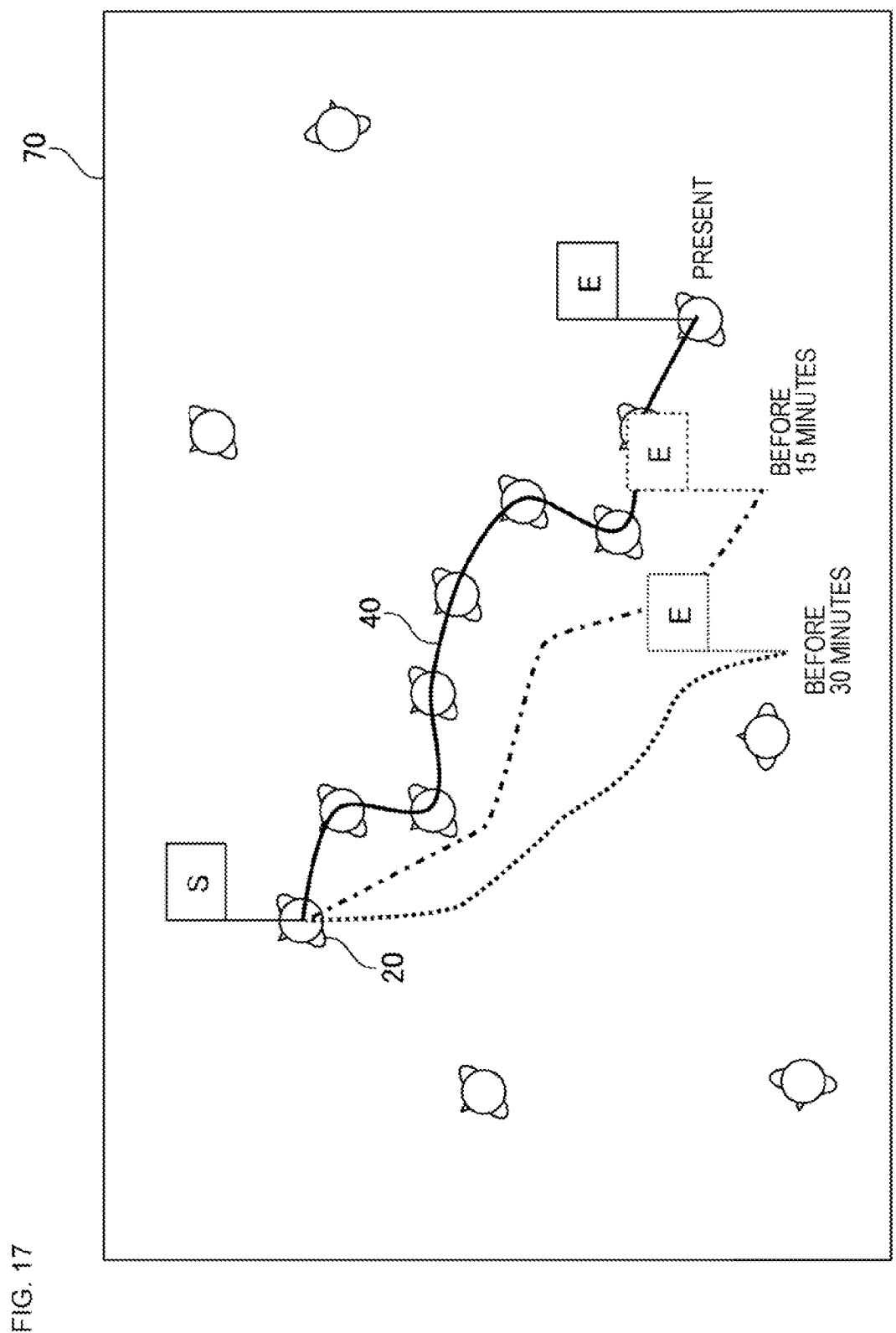
FIG. 17 is a diagram illustrating a result image including a past queue line.

FIG. 17 is a diagram illustrating the result image 70 including a past queue line 40. FIG. 17 illustrates a display (such as "present" and "before X minutes") representing a point in time associated with the queue line 40 by using lines of kinds different from each other for the queue lines 40 and near an end of the queue line 40 in such a way as to be able to identify each of the queue lines 40. The point in time associated with the queue line 40 is, for example, a point in time at which the queue line 40 is generated, and a point in time at which the target image 10 used for generation of the queue line 40 is generated. The point in time associated with the queue line 40 may be represented by an absolute point in time (such as a date and time), or may be displayed by a relative point in time with reference to a predetermined point in time (for example, a present time). A case of FIG. 17 is the latter case.

In this way, by also providing the past queue line 40 together, the present and past queue lines 40 can be easily compared, and thus various pieces of information (such as a change in length of a queue and a change in position of a queue) related to a queue can be easily acquired. For example, when it is clear that a length of a queue tends to increase, a need for action for relieving congestion can be recognized. In addition, for example, when it is clear that a position of a queue tends to move toward an unexpected position, a need for action for lining up a queue and the like can be recognized.

Herein, various methods of deciding whether a plurality of the queue lines 40 at points in time different from each other represent the same queue can be used. For example, when the queue region 30 associated with the queue line 40 generated at a certain point in time and the queue region 30 associated with the queue line 40 generated at another point in time overlap each other, it is decided that the queues represented by the queue lines 40 are the same. At this time, when a threshold value is provided for a degree of overlapping of the queue region 30 and the degree of overlapping is equal to or more than the threshold value, it may be estimated that associated queue lines 40 represent the same queue.

In addition, for example, when a distance between front positions of two queue lines 40 at points in time different from each other is equal to or less than a threshold value, the output information generation unit 2060 may decide that the queue lines 40 represent the same queue. According to the method, even when queues of the object 20 using the same facility or the same place are formed by extending in directions different from each other, the queues can be handled as the same queue.

<<Provision of Queue Line 40 to Other than Target Image 10>>

In the description above, information about the queue line 40 and the like is superimposed on the target image 10. However, information about the queue line 40 and the like may be superimposed on another image and the like.

For example, the output information generation unit 2060 may generate the result image 70 by superimposing information about the queue line 40 and the like on an image acquired from the camera 50 at a time that does not include the object 20. For example, in a case of a store and the like, by performing capturing by the camera 50 after business hours, an image that does not include the object 20 can be acquired. Such an image can be referred to as, for example, a background image.

In addition, for example, the output information generation unit 2060 may generate the result image 70 by superimposing information about the queue line 40 and the like on a map image including a capturing range of the camera 50. In this case, the queue line 40 needs to be mapped in an associated position on the map image. In other words, coordinates on the target image 10 need to be able to be converted into coordinates on the map image. Herein, an existing technique can be used as a technique for converting coordinates on an image generated by a camera into coordinates on a map image including a capturing range of the camera.

<<Prediction of Future>>

The output information generation unit 2060 may also generate, by using a plurality of the queue lines 40 generated for the same queue, a future queue line 40 for the queue. Specifically, the output information generation unit 2060 estimates a time change in the queue line 40 by using the plurality of queue lines 40 generated for the same queue, and generates the queue line 40 at a certain future point in time by using the estimation result.

Figure 18:
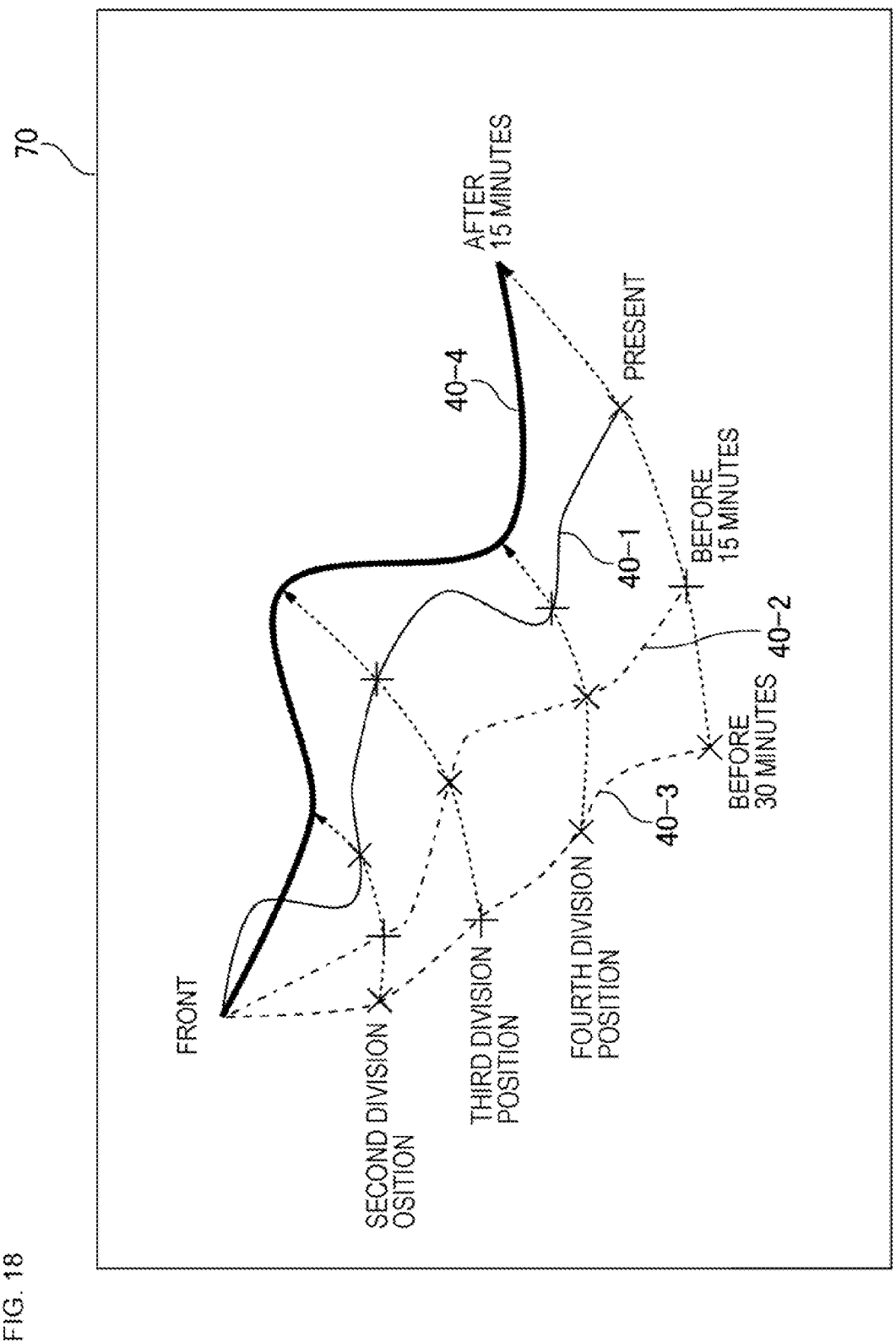
FIG. 18 is a diagram illustrating a method of estimating a future queue line.

FIG. 18 is a diagram illustrating a method of estimating a future queue line 40. In this example, the output information generation unit 2060 generates a queue line 40 (queue line 40-4) after 15 minutes by using a present queue line 40 (queue line 40-1), a queue line 40 (queue line 40-2) before 15 minutes, and a queue line 40 (queue line 40-3) before 30 minutes.

Specifically, first, the output information generation unit 2060 divides each of the queue line 40-1 to the queue line 40-3 into four. Herein, in each of the queue lines 40, positions at which the queue line 40 is divided are referred to as a second division position, a third division position, and a fourth division position in an order in which the positions are closer to a front.

The output information generation unit 2060 estimates a time change in each of the division positions and an end position by using the present and past queue lines 40. For example, the output information generation unit 2060 estimates a time change in the second division position (for example, generates a function representing the time change), based on the second division position of the queue line 40-3, the second division position of the queue line 40-2, and the second division position of the queue line 40-1. Then, the output information generation unit 2060 computes (estimates) the second division position at a point in time desired to be predicted (after 15 minutes in a case of FIG. 18), based on the point in time desired to be predicted and the estimated time change in the second division position (for example, by inputting the point in time desired to be predicted into the generated function).

Similarly, the output information generation unit 2060 also estimates, for each of the third division position, the fourth division position, and the end position, a time change thereof, and computes (estimates) the third division position, the fourth division position, and the end position at a point in time desired to be predicted, based on the point in time desired to be predicted and the estimated time change.

Then, the output information generation unit 2060 generates the queue line 40-4 at the point in time desired to be predicted by connecting the front position, the estimated second division position, the estimated third division position, the estimated fourth division position, and the estimated end position. Note that, as a method of generating the queue line 40 by connecting a plurality of positions, as described above, various methods such as a method of acquiring the queue line 40 by simple connection, a method of acquiring the queue line 40 by linear approximation, and a method of acquiring the queue line 40 by non-linear interpolation can be adopted.

Note that, it is assumed that the front position does not move in the example in FIG. 18, but the front position may also move similarly to the end position and the like. In this case, for example, the output information generation unit 2060 estimates a time change for the front position similarly to the end position and the like, and estimates a future front position, based on the estimated time change.

Herein, a future point in time at which the queue line 40 is predicted may be a point in time (for example, after 15 minutes, after an hour, and the like) having a predetermined relationship with a present time, or may be any point in time specified by a user. In the latter case, the queue analysis apparatus 2000 receives an input indicating a point in time desired to be predicted from a user, and generates the queue line 40 for the specified point in time.

A method of generating the queue line 40 for the future is not limited to the method described above. For example, an estimator learned in such a way as to output a future queue line 40 in response to an input of present and past queue lines 40 may be provided. For example, it is assumed that an estimator that generates the queue line 40 at a predicted point in time in response to an input of a "present queue line 40, a queue line 40 before 15 minutes, a queue line 40 before 30 minutes, and the predicted point in time" is provided. In this case, the estimator is learned by using, as learning data, a set of the "present queue line 40, the queue line 40 before 15 minutes, the queue line 40 before 30 minutes, the predicted point in time, and the queue line 40 at the predicted point in time". Specifically, the "present queue line 40, the queue line 40 before 15 minutes, the queue line 40 before 30 minutes, and the predicted point in time" is input into the estimator, a loss representing an error between the queue line 40 output from the estimator and the queue line 40 at the predicted point in time being included in the learning data, and a parameter of the estimator is updated based on the computed loss.

While the example embodiments of the present invention have been described with reference to the drawings, the example embodiments are only exemplification of the present invention, and various configurations other than the above-described example embodiments can also be employed.

A part or the whole of the above-described example embodiments may also be described as in supplementary notes below, which is not limited thereto.

1. A queue analysis apparatus, including:
   an estimation unit that estimates a position and an orientation of an object included in a target image; and
   a queue line generation unit that generates, for a queue region being a region including a queue of an object in the target image, a queue line representing a queue included in the queue region by a line, based on the position and the orientation being estimated for the object included in the queue region.

2. The queue analysis apparatus according to supplementary note 1, wherein
   the queue line generation unit performs, on a direction vector representing a position and an orientation of each object constituting the queue, ordering based on an adjacent relationship between direction vectors, and generates the queue line, based on the direction vector of the each object constituting the queue and an order of the direction vector.

3. The queue analysis apparatus according to supplementary note 2, wherein
   the queue line generation unit generates, for each direction vector, a line connecting an end point of the direction vector and a starting point of another direction vector located right in front of the direction vector, and generates the queue line by the generated each line and the each direction vector.

4. The queue analysis apparatus according to supplementary note 2, wherein
   the queue line generation unit generates the queue line by performing linear approximation or non-linear interpolation on the ordered direction vector.

5. The queue analysis apparatus according to any one of supplementary notes 1 to 4, further including
   an output information generation unit that generates output information including a result image in which the queue line is included.

6. The queue analysis apparatus according to supplementary note 5, wherein
   the result image is acquired by superimposing the queue line on any one of the target image, a background image in which a same range as that of the target image is included, and a map image in which a same range as that of the target image is included.

7. The queue analysis apparatus according to supplementary note 5 or 6, wherein
   the output information generation unit estimates, for a queue represented by the queue line, any one or more of a front and an end of the queue, based on a position and an orientation of an object in a queue region in which the queue is included, and includes, in the result image, a display representing any one or more of the estimated front and the estimated end.

8. The queue analysis apparatus according to any one of supplementary notes 5 to 7, wherein
   the output information generation unit computes a distance along the queue line between a front of the queue line and another position on the queue line, computes a waiting time of the queue in the another position, based on the computed distance, and includes the computed waiting time in the output information.

9. The queue analysis apparatus according to any one of supplementary notes 5 to 8, wherein
   the output information generation unit includes, in the result image, a queue line generated in the past for a queue represented by the queue line generated from the target image.

10. The queue analysis apparatus according to any one of supplementary notes 6 to 9, wherein
    the output information generation unit estimates a time change in a queue line, based on the queue line generated from the target image and a queue line generated in the past for a queue represented by the queue line, generates a future queue line for the queue, based on the estimated time change in the queue line, and includes the generated future queue line in the result image.

11. A control method executed by a computer, the control method including:
    an estimation step of estimating a position and an orientation of an object included in a target image; and
    a queue line generation step of generating, for a queue region being a region including a queue of an object in the target image, a queue line representing a queue included in the queue region by a line, based on the position and the orientation being estimated for the object included in the queue region.

12 The control method according to supplementary note 11, further including,
    in the queue line generation step, performing, on a direction vector representing a position and an orientation of each object constituting the queue, ordering based on an adjacent relationship between direction vectors, and generating the queue line, based on the direction vector of the each object constituting the queue and an order of the direction vector.

13. The control method according to supplementary note 12, further including,
    in the queue line generation step, generating, for each direction vector, a line connecting an end point of the direction vector and a starting point of another direction vector located right in front of the direction vector, and generating the queue line by the generated each line and the each direction vector.

14. The control method according to supplementary note 12, further including,
    in the queue line generation step, generating the queue line by performing linear approximation or non-linear interpolation on the ordered direction vector.

15. The control method according to any one of supplementary notes 11 to 14, further including
    an output information generation step of generating output information including a result image in which the queue line is included.

16 The control method according to supplementary note 15, wherein
    the result image is acquired by superimposing the queue line on any one of the target image, a background image in which a same range as that of the target image is included, and a map image in which a same range as that of the target image is included.

17. The control method according to supplementary note 15 or 16, further including,
    in the output information generation step, estimating, for a queue represented by the queue line, any one or more of a front and an end of the queue, based on a position and an orientation of an object in a queue region in which the queue is included, and including, in the result image, a display representing any one or more of the estimated front and the estimated end.

18. The control method according to any one of supplementary notes 15 to 17, further including,
    in the output information generation step, computing a distance along the queue line between a front of the queue line and another position on the queue line, computing a waiting time of the queue in the another position, based on the computed distance, and including the computed waiting time in the output information.

19. The control method according to any one of supplementary notes 15 to 18, further including,
    in the output information generation step, including, in the result image, a queue line generated in the past for a queue represented by the queue line generated from the target image.

20. The control method according to any one of supplementary notes 16 to 19, further including,
    in the output information generation step, estimating a time change in a queue line, based on the queue line generated from the target image and a queue line generated in the past for a queue represented by the queue line, generating a future queue line for the queue, based on the estimated time change in the queue line, and including the generated future queue line in the result image.

21. A program causing a computer to execute the control method according to any one of supplementary notes 11 to 20.

REFERENCE SIGNS LIST

10 Target image
20 Object
30 Queue region
40 Queue line
50 Camera
60 Direction vector
70 Result image
72 Front marker
74 End marker
90 Waiting time display
100 Division position
102 Display
104 Display
110 Division position
112 Display
114 Display
1000 Computer
1020 Bus
1040 Processor
1060 Memory
1080 Storage device
1100 Input/output interface
1120 Network interface
2000 Queue analysis apparatus
2020 Estimation unit
2040 Queue line generation unit
2060 Output information generation unit

What is claimed is:
1. A queue analysis apparatus, comprising:
at least one memory configured to store instructions; and
at least one processor configured to execute the instructions to perform operations comprising:
estimating a position and an orientation of an object included in a target image;
generating, for a queue region being a region including a queue of an object in the target image, a queue line representing a queue included in the queue region by a line, based on the position and the orientation being estimated for the object included in the queue region; and
generating output information including a result image in which the queue line is included, wherein
the result image is acquired by superimposing the queue line on any one of the target image, a background image in which a same range as that of the target image is included, and a map image in which a same range as that of the target image is included, and the operations further comprise:

estimating a time change in a queue line, based on the queue line generated from the target image and a queue line generated in the past for a queue represented by the queue line;

generating a future queue line for the queue, based on the estimated time change in the queue line; and including the generated future queue line in the result image.

2. The queue analysis apparatus according to claim 1, wherein the operations comprise:

performing, on a direction vector representing a position and an orientation of each object constituting the queue, ordering based on an adjacent relationship between direction vectors; and generating the queue line, based on the direction vector of the each object constituting the queue and an order of the direction vector.

3. The queue analysis apparatus according to claim 2, wherein the operations comprise:

generating, for each direction vector, a line connecting an end point of the direction vector and a starting point of another direction vector located right in front of the direction vector; and generating the queue line by the generated each line and the each direction vector.

4. The queue analysis apparatus according to claim 2, wherein the operations comprise generating the queue line by performing linear approximation or non-linear interpolation on the ordered direction vector.

5. The queue analysis apparatus according to claim 1, wherein the operations comprise:

estimating, for a queue represented by the queue line, any one or more of a front and an end of the queue, based on a position and an orientation of an object in a queue region in which the queue is included; and including, in the result image, a display representing any one or more of the estimated front and the estimated end.

6. The queue analysis apparatus according to claim 1, wherein the operations comprise:

computing a distance along the queue line between a front of the queue line and another position on the queue line;

computing a waiting time of the queue in the another position, based on the computed distance; and including the computed waiting time in the output information.

7. The queue analysis apparatus according to claim 1, wherein the operations comprise including, in the result image, a queue line generated in the past for a queue represented by the queue line generated from the target image.

8. A control method executed by a computer, the control method comprising:

estimating a position and an orientation of an object included in a target image;

generating, for a queue region being a region including a queue of an object in the target image, a queue line representing a queue included in the queue region by a line, based on the position and the orientation being estimated for the object included in the queue region; and generating output information including a result image in which the queue line is included, wherein the result image is acquired by superimposing the queue line on any one of the target image, a background image in which a same range as that of the target image is included, and a map image in which a same range as that of the target image is included, and the control method further comprises:

estimating a time change in a queue line, based on the queue line generated from the target image and a queue line generated in the past for a queue represented by the queue line, generating a future queue line for the queue, based on the estimated time change in the queue line; and including the generated future queue line in the result image.

9. The control method according to claim 8, further comprising, performing, on a direction vector representing a position and an orientation of each object constituting the queue, ordering based on an adjacent relationship between direction vectors, and generating the queue line, based on the direction vector of the each object constituting the queue and an order of the direction vector.

10. The control method according to claim 9, further comprising, generating the queue line by performing linear approximation or non-linear interpolation on the ordered direction vector.

11. The control method according to claim 8, further comprising, estimating, for a queue represented by the queue line, any one or more of a front and an end of the queue, based on a position and an orientation of an object in a queue region in which the queue is included, and including, in the result image, a display representing any one or more of the estimated front and the estimated end.

12. The control method according to claim 8, further comprising, computing a distance along the queue line between a front of the queue line and another position on the queue line, computing a waiting time of the queue in the another position, based on the computed distance, and including the computed waiting time in the output information.

13. The control method according to claim 8, further comprising, including, in the result image, a queue line generated in the past for a queue represented by the queue line generated from the target image.

14. A non-transitory computer-readable medium storing a program causing a computer to execute a control method, the control method comprising:

estimating a position and an orientation of an object included in a target image;

generating, for a queue region being a region including a queue of an object in the target image, a queue line representing a queue included in the queue region by a line, based on the position and the orientation being estimated for the object included in the queue region; and generating output information including a result image in which the queue line is included, wherein the result image is acquired by superimposing the queue line on any one of the target image, a background image in which a same range as that of the target image is included, and a map image in which a same range as that of the target image is included, and the operations further comprise:
- estimating a time change in a queue line, based on the queue line generated from the target image and a queue line generated in the past for a queue represented by the queue line;
- generating a future queue line for the queue, based on the estimated time change in the queue line; and
- including the generated future queue line in the result image.

* * * * *